(12) United States Patent
Kunimatsu et al.

(10) Patent No.: US 7,057,693 B2
(45) Date of Patent: Jun. 6, 2006

(54) DISPLAY DEVICE

(75) Inventors: Noboru Kunimatsu, Mobara (JP); Hidehiro Sonoda, Mobara (JP); Setsuo Kobayashi, Mobara (JP)

(73) Assignee: Hitachi Displays, Ltd., Mobara (JP)

( * ) Notice: Subject to any disclaimer, the term of this patent is extended or adjusted under 35 U.S.C. 154(b) by 10 days.

(21) Appl. No.: 10/726,514

(22) Filed: Dec. 4, 2003

(65) Prior Publication Data
US 2004/0119661 A1   Jun. 24, 2004

(30) Foreign Application Priority Data
Dec. 4, 2002   (JP) ............................ 2002-352155

(51) Int. Cl.
*G02F 1/1337* (2006.01)
(52) U.S. Cl. ...................... 349/129; 349/130
(58) Field of Classification Search ........... 349/129, 349/130
See application file for complete search history.

(56) References Cited
U.S. PATENT DOCUMENTS
2001/0020992 A1 * 9/2001 Takeda et al. ............. 349/130

FOREIGN PATENT DOCUMENTS

| JP | 11-072793 | 3/1999 |
|---|---|---|
| JP | 2000-047217 | 2/2000 |
| JP | 2000-284290 | 10/2000 |
| JP | 2002-014353 | 1/2002 |

* cited by examiner

*Primary Examiner*—James A. Dudek
(74) *Attorney, Agent, or Firm*—Antonelli, Terry, Stout and Kraus, LLP.

(57) ABSTRACT

A liquid crystal display device can obviate the generation of an extinction pattern. In the liquid crystal display device, molecules of liquid crystal are arranged in the vertical direction with respect to the substrate at the time of applying no voltage. A plurality of protruding portions are scattered on a surface of one substrate which is brought into contact with the liquid crystal material in respective pixel regions, and projecting portions or recessed portions are provided about these protruding portions. The projecting portions or the recessed portions are substantially aligned with the directions of the respective polarization axes of one polarizer which is provided to a surface of one substrate at a side opposite to a liquid crystal side and the other polarizer which is provided to a surface of the other substrate at a side opposite to a liquid crystal side.

6 Claims, 10 Drawing Sheets

DISPLAY DEVICE

BACKGROUND OF THE INVENTION

The present invention relates to a display device, especially, to a liquid crystal display device.

Among various types of liquid crystal display devices, there is a liquid crystal display device in which a pair of substrates face each other in an opposed manner with liquid crystal material sandwiched therebetween. On respective pixel regions at a liquid-crystal-side of one substrate, pixel electrodes made of transparent conductive layers are formed; and, on a liquid crystal side of the other substrate, a counter electrode, which is made of a transparent conductive layer and corresponds in common to the respective pixel regions, is formed. The optical transmissivity of the liquid crystal material is controlled by electric fields generated between the respective electrodes in each pixel region, wherein molecules of the liquid crystal material are vertically aligned with respect to the substrates when no electric field is applied to the liquid crystal material (see Japanese Unexamined Patent Publication 2002-14353, Japanese Unexamined Patent Publication 1999-72793, Japanese Unexamined Patent Publication 2002-284290, for example).

In the liquid crystal display device having such a constitution, in order to obtain broad viewing angle characteristics, the pixel electrode is divided into a plurality of regions, thus forming divided electrodes (hereinafter referred to as "sub pixels"); and, on a liquid-crystal-side surface of a substrate at a side on which the counter electrodes are formed, projecting portions are formed at positions which face the centers of respective sub pixels (see Japanese Unexamined Patent Publication 2002-47217, for example). When an electric field is generated between the pixel electrode and the counter electrode, respective molecules of the liquid crystal material on the sub pixel exhibit a behavior in which the molecules tilt radially around the projecting portion as the center. Due to such a behavior, light which passes through the liquid crystal material can be irradiated to a viewer side in a broad range.

However, with respect to a liquid crystal display device having such a constitution, it has been confirmed that, when an electric field is generated between the pixel electrode and the counter electrode, a cruciform blackish pattern (hereinafter referred to as an "extinction pattern") appears, as shown in FIG. 12, for every sub pixel of the pixel electrode, and, hence, a white display is not produced over the whole display surface.

The inventors of the present invention have pursued an investigation to determine the cause of the phenomenon and have eventually found that one one-stroke shaped blackish pattern of the extinction pattern agrees with the direction of the polarization axis of one polarizer of the polarizers which are formed on the respective substrates, while another one-stroke shaped blackish pattern thereof agrees with the direction of the polarization axis of the other polarizer.

It has been confirmed that this phenomenon is caused by the fact that, when the liquid crystal molecules are tilted in parallel with respect to the substrate, the liquid crystal molecules are collectively tilted along the directions of the polarization axes of the respective polarizers.

The present invention has been made on the basis of such circumstances, and it is an object of the present invention to provide a liquid crystal display device which can obviate the generation of the above-mentioned extinction pattern.

SUMMARY OF THE INVENTION

A summary of typical aspects of the invention disclosed in this specification will be presented as follows.

EXAMPLE 1

The liquid crystal display device according to the present invention is, for example, characterized in that molecules of liquid crystal material, which is interposed between respective substrates that are arranged to face each other in an opposed manner, are arranged in the vertical direction with respect to the substrate at the time of applying no voltage; and, the liquid crystal display device further includes a plurality of protruding portions which are scattered on a surface of one substrate which is in contact with the liquid crystal material in respective pixel regions, and projecting portions or recessed portions which are provided about these protruding portions, the projecting portions or the recessed portions being substantially aligned with respective polarization axes of one polarizer, which is provided on a surface of one substrate at a side opposite to a liquid crystal side and of another polarizer which is provided on a surface of the other substrate at a side opposite to the liquid crystal side.

EXAMPLE 2

The liquid crystal display device according to the present invention is, for example, characterized in that respective substrates are arranged to face each other in an opposed manner with liquid crystal material sandwiched therebetween, and molecules of the liquid crystal material are activated due to an electric field generated between one electrode which is formed on a liquid crystal side of one of the respective substrates and another electrode which is formed on a liquid crystal side of the other of the respective substrates. The liquid crystal display device includes one polarizer which is provided on a surface of the one substrate at a side opposite to the liquid crystal side thereof, and another polarizer which is provided on a surface of the other substrate at a side opposite to the liquid crystal side. The one electrode is constituted of a mass of a plurality of sub pixels, and protruding portions which are positioned at substantially the centers of respective sub pixels on a surface of the other substrate which faces the liquid crystal material, and projecting portions or recessed portions are provided about these protruding portions. The projecting portions or the recessed portions are substantially aligned with respective axes of one polarizer, which is provided on a surface of the one substrate at a side opposite to a liquid crystal side and the other polarizer which is provided on a surface of the other substrate at a side opposite to a liquid crystal side.

EXAMPLE 3

The liquid crystal display device according to the present invention is, for example, characterized in that, on each pixel region of a liquid-crystal-side surface of one of respective substrates which are arranged to face each other in an opposed manner with liquid crystal sandwiched therebetween, there are a switching element which is driven by scanning signals from a gate signal line and a pixel electrode to which video signals are supplied from a drain signal line via the switching element, a counter electrode which corresponds in common to respective pixel regions that are formed on respective pixel regions on a liquid-crystal-side surface of the other substrate, and one polarizer which is provided to a surface of one substrate at a side opposite to a liquid crystal side and another polarizer which is provided to a surface of the other substrate at a side opposite to a liquid crystal side, and the pixel electrode is constituted of a mass of a plurality of sub pixels, and protruding portions are positioned at substantially the centers of respective sub pixels on a surface of the other substrate which faces the liquid crystal, and projecting portions or recessed portions are provided about these protruding portions, the projecting portions or the recessed portions being substantially aligned with respective directions of axes of one polarizer which is provided to a surface of one substrate at a side opposite to a liquid crystal side and another polarizer which is provided to a surface of the other substrate at a side opposite to a liquid crystal side.

EXAMPLE 4

The liquid crystal display device according to the present invention is, for example, characterized in that, on each pixel region of a liquid-crystal-side surface of one of respective substrates which are arranged to face each other in an opposed manner with liquid crystal sandwiched therebetween, there are a switching element which is driven by scanning signals from a gate signal line and a pixel electrode to which video signals are supplied from a drain signal line via the switching element. A counter electrode which corresponds in common to respective pixel regions is formed on a liquid-crystal-side surface of another substrate, and one polarizer is provided to a surface of one substrate at a side opposite to a liquid crystal side and another polarizer is provided to a surface of the other substrate at a side opposite to a liquid crystal side. The counter electrode is constituted of a mass of a plurality of sub pixels in each pixel region, and protruding portions are positioned at substantially the centers of respective sub pixels, and projecting portions or recessed portions are provided about these protruding portions on a surface of a substrate which is brought into contact with the liquid crystal, the projecting portions or the recessed portions being substantially aligned with respective axes of one polarizer which is provided to a surface of one substrate at a side opposite to a liquid crystal side and of another polarizer which is provided to a surface of the other substrate at a side opposite to a liquid crystal side.

EXAMPLE 5

The liquid crystal display device according to the present invention is, for example, on the premise of the constitution of any one of Examples 1 to 4, characterized in that the liquid crystal contains a chiral material.

EXAMPLE 6

The liquid crystal display device according to the present invention is, for example, on the premise of the constitution of any one of Examples 1 to 4, characterized in that the liquid crystal contains no chiral material.

EXAMPLE 7

The liquid crystal display device according to the present invention is, for example, on the premise of the constitution of Example 3, characterized in that the projecting portions or the recessed portions are formed on a surface of a leveling film which is formed on a surface of the other substrate which is brought into contact with the liquid crystal.

EXAMPLE 8

The liquid crystal display device according to the present invention is, for example, on the premise of the constitution of Example 7, characterized in that the counter electrode is formed on a surface of a leveling film and the protruding portions are formed on a surface of the counter electrode.

EXAMPLE 9

The liquid crystal display device according to the present invention is, for example, on the premise of the constitution of Example 7, characterized in that the protruding portions are formed on a surface of a leveling film and the counter electrode is formed on a surface of the leveling film such that the counter electrode also covers the projecting portions.

The present invention is not limited to the above-mentioned constitutions and various modifications are conceivable without departing from the technical concept of the present invention.

DESCRIPTION OF THE PREFERRED EMBODIMENTS

Preferred embodiments of the present invention will be described in conjunction with the drawings.

Embodiment 1

<<Overall constitution>>

Figure 2A:
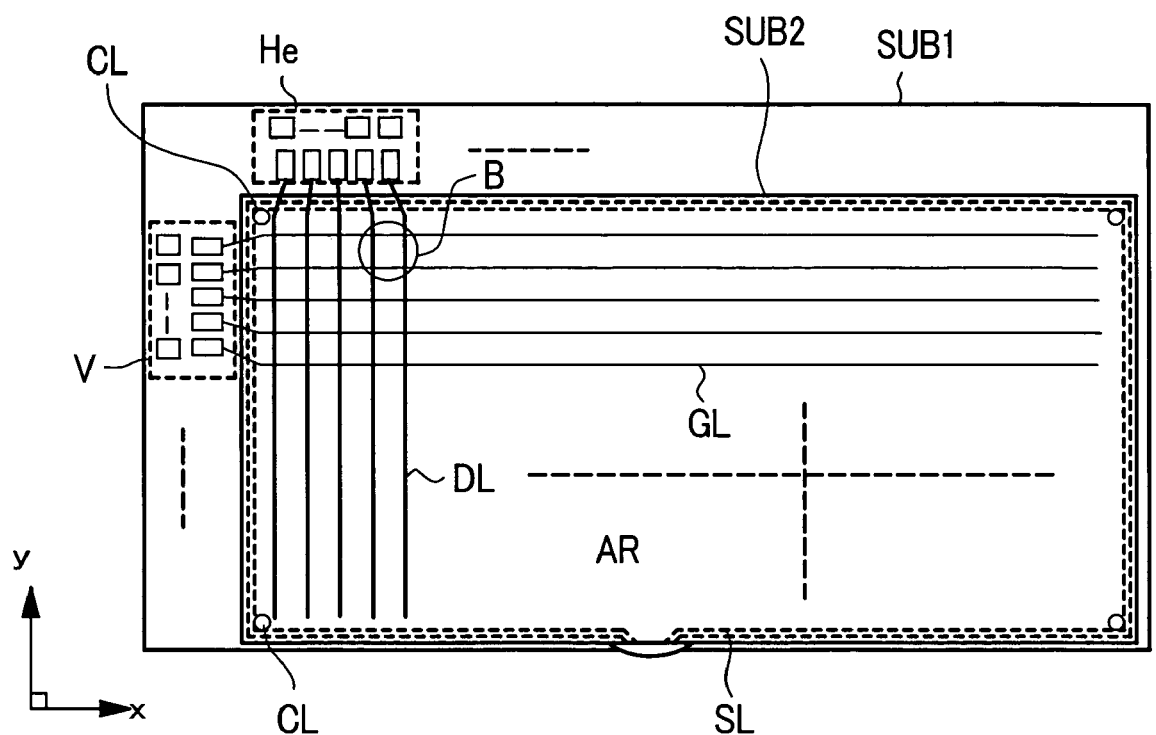
FIG. 2A is a diagrammatic plan view showing one embodiment of the overall structure of the liquid crystal display device according to the present invention.
Figure 2B:
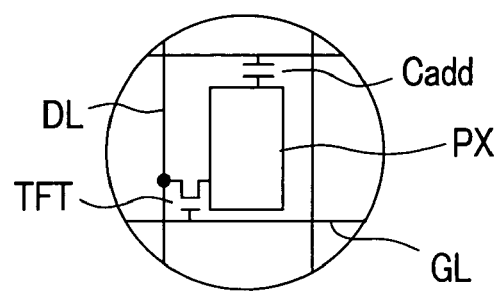
FIG. 2B is an enlarged view showing a pixel portion B in FIG. 2A as an equivalent circuit.

FIG. 2A is a plan view showing one embodiment of a liquid crystal display device according to the present invention, and FIG. 2B is an equivalent circuit diagram of a typical pixel portion.

In FIG. 2A, first of all, there is provided a pair of transparent substrates SUB1, SUB2, which are arranged to face each other in an opposed manner with liquid crystal material sandwiched therebetween, wherein the liquid crystal material is sealed between the transparent substrates SUB1, SUB2 by a sealing material SL, which also serves to fix the transparent substrate SUB2 to the transparent substrate SUB1.

On a liquid-crystal-side surface of the transparent substrate SUB1, which is surrounded by the sealing material SL, gate signal lines GL extend in the x direction and are arranged in parallel in the y direction and drain signal lines DL extend in the y direction and are arranged in parallel in the x direction Regions which are defined by respective gate signal lines GL and respective drain signal lines DL constitute pixel regions, and a plurality of these pixel regions are disposed in a matrix array so as to constitute a liquid crystal display part AR.

Each pixel region includes a thin film transistor TFT, which is operated in response to a scanning signal from one-side gate signal line GL and a pixel electrode PX to which a video signal from one-side drain signal line DL is supplied through the thin film transistor TFT.

An electric field is generated between this pixel electrode PX and a counter electrode CT (not shown in the drawings), which is formed on a liquid-crystal-side surface of the other transparent substrate SUB2 in common with respect to respective pixel regions, and the optical transmissivity of the liquid crystal material is controlled in response to the electric field.

Here, between the pixel electrode PX and another gate signal line GL, which is arranged close to the gate signal line GL that is used for driving the thin film transistor TFT of the pixel region, an additional capacitance element Cadd is formed. This additional capacitance element Cadd is provided for holding the video signals that are supplied to the pixel electrode PX. Further, the counter electrode CT is configured to be pulled out to the transparent-substrate-SUB1 side surface by way of conductors CL that are formed at the four corners of the sealing material SL.

Respective ends of the gate signal lines GL extend beyond the sealing material SL, and the extended ends constitute terminals to which output terminals of the scanning signal drive circuit V are connected. Further, to input terminals of the scanning signal drive circuit V, signals from a printed circuit board (not shown in the drawings), which is arranged outside the liquid crystal display panel, are inputted.

The scanning signal drive circuit V is constituted of a plurality of semiconductor devices, and a plurality of neighboring gate signal lines GL which are formed into a group, with one semiconductor device being allocated to each group.

In the same manner, respective ends of the drain signal lines DL extend beyond the sealing material SL, and the extended ends constitute terminals to which output terminals of the video signal drive circuit He are connected. Further, to input terminals of the video signal drive circuit He, signals from a printed circuit board (not shown in the drawings), which is arranged outside a liquid crystal display panel, are inputted.

The video signal drive circuit He is also constituted of a plurality of semiconductor devices, and a plurality of neighboring drain signal lines DL are formed into a group, with one semiconductor device being allocated to each group.

The respective gate signal lines GL are sequentially selected one after another in response to the scanning signals from the scanning signal drive circuit V. Further, to respective drain signal lines DL, the video signals are supplied by the video signal drive circuit He at the timing of selecting the gate signal lines GL.

Here, in the above-mentioned embodiment, the scanning signal drive circuit V and the video signal drive circuit He are constituted of semiconductor devices mounted on the transparent substrate SUB1. However, these circuits may be formed of so-called tape-carrier-method semiconductor devices which are connected to each other so as to bridge the transparent substrate SUB1 and the printed circuit board, for example. Further, when semiconductor layers of the thin film transistors TFT are made of poly-crystalline silicon (p—Si), semiconductor elements made of polycrystalline silicon may be formed on a surface of the transparent substrate SUB1 together with the wiring layers.

<<Constitution of pixels>>

Figure 3:
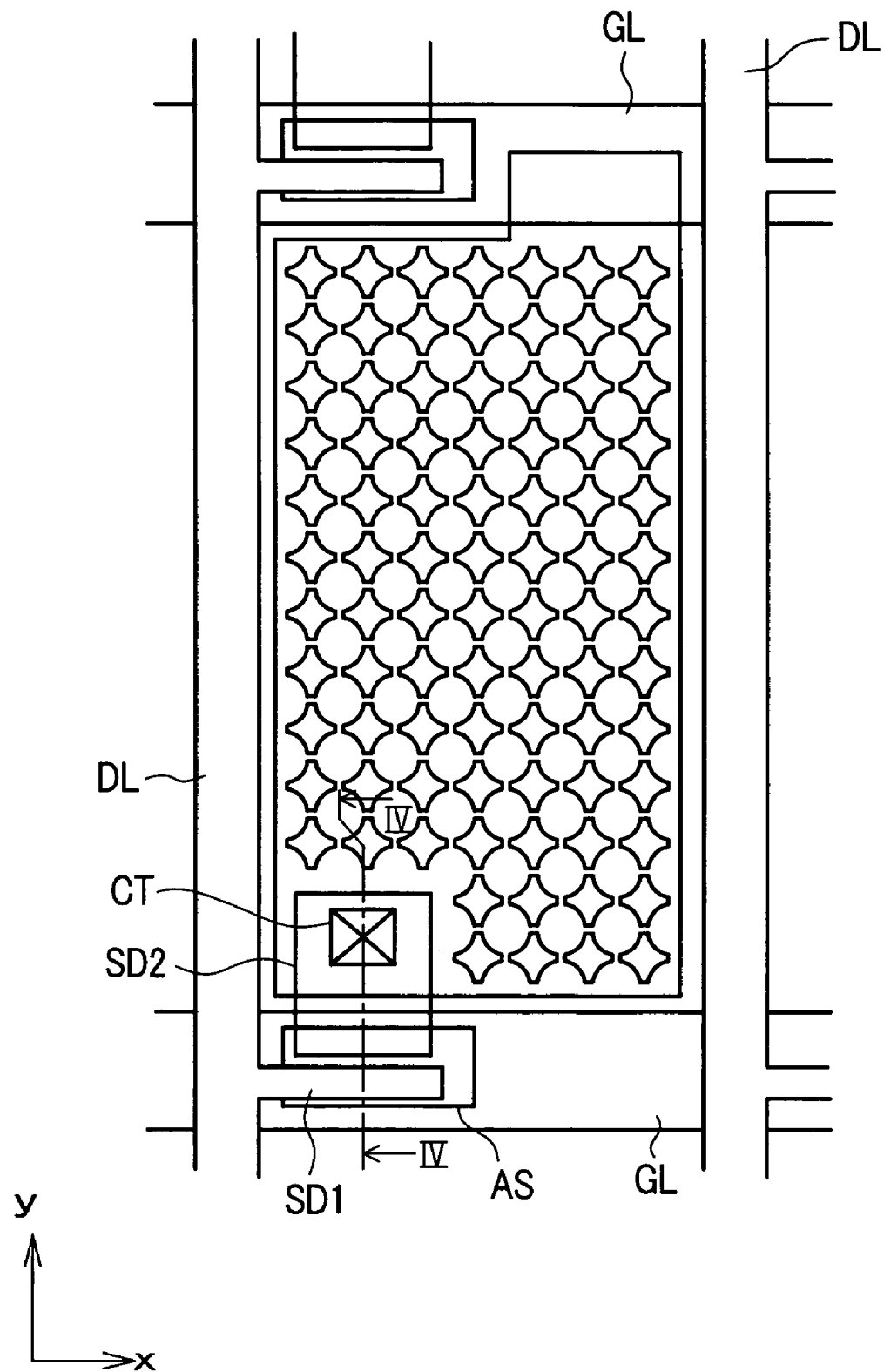
FIG. 3 is a diagrammatic plan view showing one embodiment of a pixel of the liquid crystal display device according to the present invention.
Figure 4:
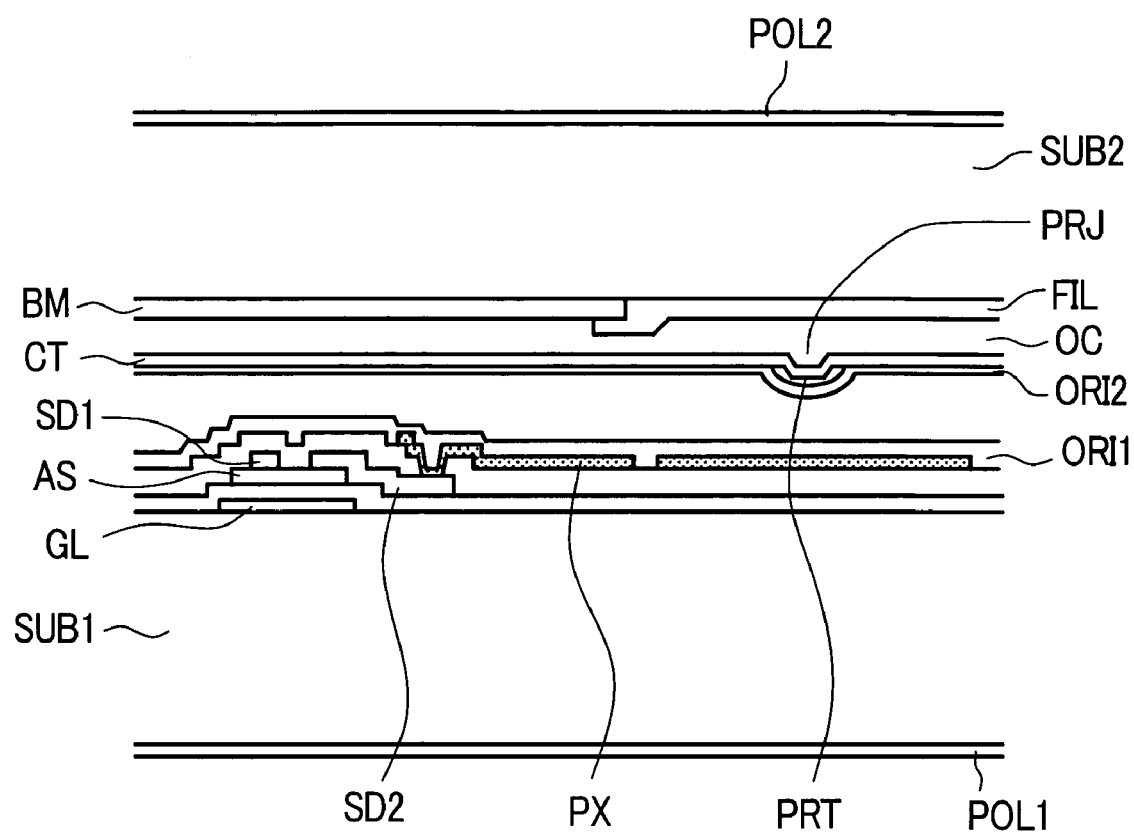
FIG. 4 is a cross-sectional view taken along a line IV—IV in FIG. 3.

FIG. 3 is a plan view showing one embodiment of the construction of a typical pixel, and FIG. 4 is a cross sectional view taken along a line IV—IV in FIG. 3.

In FIG. 3, first of all, a pair of gate signal lines GL, which extend in the x direction and are arranged in parallel in the y direction, are formed on the liquid-crystal-side surface of the transparent substrate SUB1. Here, as the liquid crystal material, for example, liquid crystal which has a negative dielectric anisotropy and is oriented substantially vertically with respect to the transparent substrate SUB1 at the time of applying no electric field is used. The gate signal lines GL surround the rectangular region together with a pair of drain signal lines DL to be described later, and this region constitutes a pixel region.

On the surface of the transparent substrate on which gate signal lines are formed, an insulation film GI (see FIG. 4) which is made of SiN, for example, is formed such that the insulation film GI also covers the gate signal lines GL. The insulation film GI functions as an interlayer insulation film with respect to the gate signal lines GL in regions where the drain signal lines DL are formed, and it functions as a gate insulation film in regions where the thin film transistors TFT to be described later are formed, and it functions as a dielectric film in regions where capacitive elements Cadd to be described later are formed.

On a surface of the insulation film GI, semiconductor layers AS made of amorphous Si, for example, are formed such that the semiconductor layers AS are overlapped to portions of the gate signal lines GL. The semiconductor layer AS is a semiconductor layer of the thin film transistor TFT wherein, by forming a drain electrode SD1 and a source electrode SD2 on an upper surface thereof, it is possible to constitute an MIS type transistor having an inverse-staggered structure that uses a portion of the gate signal line GL as the gate electrode.

Here, the drain electrodes SD1 and the source electrodes SD2 are formed simultaneously with the formation of the drain signal lines DL. That is, when the drain signal lines DL which extend in the y direction and are arranged in parallel in the x direction are formed, portions of the drain signal lines DL extend to a position above the upper surfaces of the semiconductor layers AS so as to form the drain electrodes SD1. Further, the source electrodes SD2 are formed in a spaced-apart manner from the drain electrodes SD1 by a channel length of the thin film transistor TFT.

The source electrode SD2 is slightly extended from the semiconductor layer AS surface to an upper surface of the insulation film at the pixel region side, thus forming a contact portion CT for establishing a connection with the pixel electrode PX to be described later.

Here, a thin layer doped with impurities of high concentration is formed at interfaces between the semiconductor layer AS and the drain electrode SD1, as well as the source electrode SD2, and this layer functions as a contact layer. The contact layer is formed such that, at the time of forming the semiconductor layer AS, the impurity layer of high concentration is already formed on a surface of the semiconductor layer AS, and, using a pattern of the drain electrode SD1 and the source electrode SD2 that are formed on an upper surface of the impurity layer as masks, the impurity layer exposed from the masks is etched so as to form the contact layer.

On the surface of the transparent substrate SUB1 on which the thin film transistors TFT, the drain signal lines DL, the drain electrodes SD1 and the source electrodes SD2 are formed in the above-mentioned manner, a protective film PAS that is formed of a low-dielectric insulation film made of resin or the like, for example, is formed. The protective film PAS is provided for preventing the thin film transistors TFT from coming into direct contact with the liquid crystal material, and, hence, it can prevent deterioration of the characteristics of the thin film transistors TFT.

On an upper surface of the protective film, the pixel electrodes PX are formed. The pixel electrode PX is formed of a light-transmitting conductive film made of, for example, ITO (Indium Tin Oxide), ITZO (Indium Tin Zinc Oxide), IZO (Indium Zinc Oxide), $SnO_2$ (Tin Oxide), $In_2O_2$ (Indium Oxide) or the like. The pixel electrode PX is constituted of a mass which is formed of a large number of electrodes (sub pixels) having a circular pattern, for example. That is, the pixel electrode PX is constituted such that a plurality of circular sub pixels are formed in a matrix array.

Each sub pixel, except for those which form the pixel boundary, is electrically connected with four neighboring sub pixels through light-transmitting conductive films having a relatively narrow width, which are integrally formed with the sub pixels. In other words, the pixel electrode PX is formed to have a shape in which a large number of openings having a diamond shape (respective sides having an arcuate shape directed inwardly), which are arranged in a matrix array, are formed in a light-transmitting conductive film formed in a planar shape over the major portion of the pixel region.

The pixel electrode PX has a portion at the periphery thereof which is electrically connected with the source electrode SD2 of the thin film transistor TFT through the contact portion CT that is formed on the protective film PAS.

Then, on an upper surface of the transparent substrate SUB1 on which the pixel electrodes PX are formed in the above-mentioned manner, an orientation film ORI1 is formed such that the orientation film ORI1 also covers the pixel electrodes PX. The orientation film ORI1 is a film which is brought into direct contact with the liquid crystal material, and it determines the initial orientation direction of the molecules of the liquid crystal. Further, on a surface of the transparent substrate SUB1 opposite to the liquid crystal, a polarizer POL1 is formed.

On the other hand, on a liquid-crystal-side surface of the transparent substrate SUB2, a black matrix BM is formed such that the black matrix BM defines respective pixel regions. That is, the black matrix BM is formed in a pattern such that openings are formed in the black matrix BM, except for peripheral portions of respective pixel regions (including portions which cover the thin film transistors TFT). Due to such a constitution, the display contrast can be enhanced, and deterioration of the characteristics of the thin film transistors TFT can be obviated.

On the surface of the transparent substrate SUB2 on which the black matrix BM is formed, color filters FIL are formed such that the color filters FIL cover the openings formed in the black matrix BM. The color filters FIL are constituted of filters of respective colors, for example, red(R), green (G) and blue (B). The color filters are formed in an arrangement such that the red filters, for example, are commonly formed on a group of respective pixel regions which are arranged in parallel in the y direction, while groups of pixel regions which are sequentially arranged close to each other in the x direction are arranged in the order of red (R), green (G), blue (B), red (R), . . . starting from the above-mentioned group of pixel regions of red (R) color.

Then, a leveling film OC is formed such that the leveling film OC also covers the black matrix BM and the color filters FIL. On portions of the leveling film OC which face the centers of respective sub pixels at the transparent substrate SUB1 side, cruciform projecting portions PRJ are formed such that the projecting portions PRJ intersect the portions.

Figure 1:
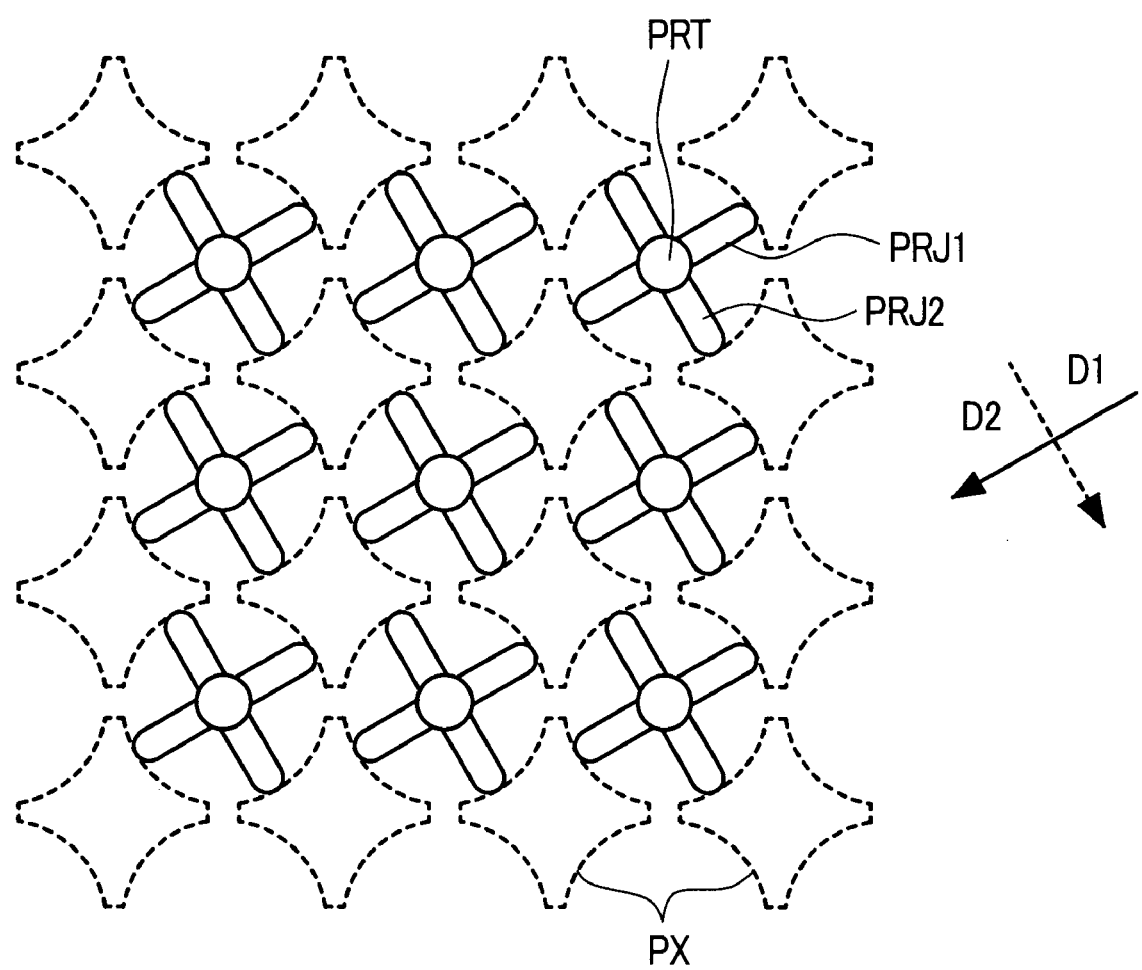
FIG. 1 is a diagram showing one embodiment of a liquid crystal display device according to the present invention as a plan view of pixel electrodes at one substrate side and protruding portions and projecting portions at the other substrate side in an overlapped manner.

That is, as shown in FIG. 1 in which the leveling film OC is overlapped relative to respective sub pixels of the pixel electrode PX, the cruciform projecting portions PRJ are formed such that out of the cruciform projecting portions PRJ, for example, one one-stroke shape projecting portion PRJ1 is substantially aligned with the polarization axis direction D1 of the polarizer POL1 at the transparent substrate SUB1 side, and another one-stroke shape projecting PRJ2 is substantially aligned with the polarization axis direction D2 of the polarizer POL2 at the transparent substrate SUB2 side. Advantageous effects brought about by the cruciform projecting portions PRJ having such a constitution will be explained in detail later.

Further, as another embodiment, in place of the above-mentioned cruciform projecting portions PRJ, cruciform recessed portions DNT may be formed. This constitution also can produce substantially the same advantageous effects.

On a surface of the leveling film OC which is formed in the above-mentioned manner, there is a counter electrode CT which is formed of a transparent conductive film. To the counter electrode CT, signals which become a reference with respect to the video signal supplied to the pixel electrodes PX are supplied.

Then, on portions of the counter electrode CT which face the centers of respective sub pixels at the transparent substrate SUB1 side, that is, on the intersecting portions of the cruciform projecting portions PRJ, protruding portions PRT formed of a resin material or the like, for example, are formed. Further, an orientation film OR12 is formed on the counter electrode CT such that the orientation film OR12 also covers the protruding portions PRT. The orientation film OR12 is a film which is brought into direct contact with the liquid crystal material and it determines the initial orientation direction of the molecules of the liquid crystal.

Figure 5:
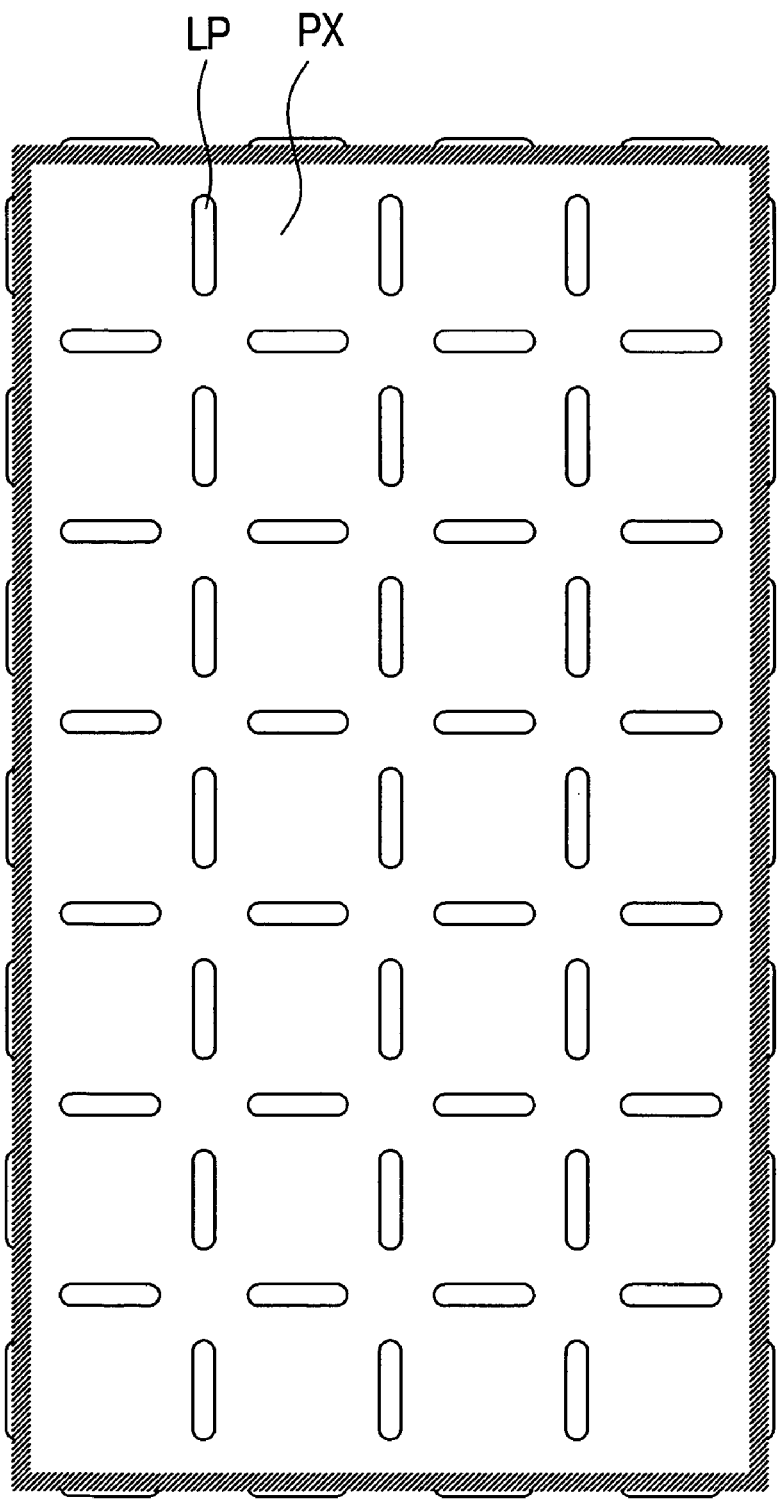
FIG. 5 is a diagrammatic plan view of another embodiment of a pixel electrode of the liquid crystal display device according to the present invention.

In the above-mentioned embodiment, the sub pixels which constitute the pixel electrode PX are formed into a substantially circular shape. However, the sub pixels also may be formed into a substantially rectangular shape, as shown in FIG. 5. That is, with respect to the pixel electrode PX, in a conductive layer formed in a planar shape, a plurality of elongated holes LP, which are intermittently arranged in parallel in the x direction, and a plurality of elongated holes LP, which are intermittently arranged in parallel in the y direction, are formed, wherein a rectangular pattern which uses portions corresponding to four elongated holes LP arranged close to each other as the sides thereof is connected with other neighboring patterns by way of the corners thereof.

Here, by providing the pixel electrode PX with such a constitution, the directions of the electric fields which are generated on the sub pixels differ; and, hence, the directions of the polarization axes of the polarizers and the extending directions of the recessed portions and projecting portions differ from each other. The significance of this will be explained later.

<<Observation>>

Here, the extending directions of the projecting portions PRJ or the recessed portions DNT formed at the transparent substrate SUB2 side will be explained in conjunction with FIG. 6.

Figure 6:
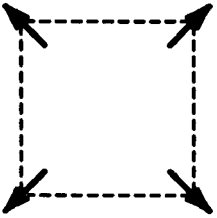
FIG. 6 is a diagram showing the relationship between the direction of projecting portions formed in the liquid crystal display device according to the present invention and the directions of polarization axes of respective polarizers.

First of all, FIG. 6 shows the extending directions of the projecting portions PRJ or the recessed portions DNT by reference to two cases, wherein the chiral material is not contained in the liquid crystal material in one case 6A and wherein the chiral material is contained in the liquid crystal material in another case 6B. This is because, when the chiral material is contained in the liquid crystal material, the liquid crystal molecules exhibit a twisted behavior.

Here, it is possible to detect whether the chiral material is contained in the liquid crystal material of the liquid crystal display device or not in a following manner. First of all, the liquid crystal material inside the liquid crystal display device is taken out by disassembling the liquid crystal display device, and, thereafter, the liquid crystal material is filled in a so-called wedge-like cell (cano cell). With respect to liquid crystal material which contains chiral material, when the cell is observed using a polarization microscope, a stripe pattern having a particular color tone change is observed, and, hence, it is found that the cell is partitioned by parallel lines (disclination), so-called Grandjean-cano walls (see literature: Ekisho(liquid crystal), Kisohen (fundamental part), Baifukan, page 227).

In FIG. 6, an example is shown a case in which the first stage and the second stage use a liquid crystal material containing no chiral material, and the third stage and the fourth stage use a liquid crystal material containing chiral material. Further, in the respective stages, as seen in the drawing, the left column 6X indicates the direction of the electric field in the sub pixels at the TFT side (transparent substrate SUB1 side), the center column 6Y indicates the structure of protruding portions or the like at the CF side (transparent substrate SUB2 side), and the right column 6Z indicates the direction of the polarization axes of the respective polarizers.

Here, the direction of electric field in the sub pixels depends on the shape of the sub pixels of the pixel electrode PX. With respect to the directions of the polarization axes of the respective polarizers, one direction of the polarization axis indicates the direction of the polarization axis of the polarizer POL1 provided to the surface of the transparent substrate SUB1 opposite to the liquid crystal material, and the other direction of polarization axis indicates the direction of the polarization axis of the polarizer POL2 provided to the surface of the transparent substrate SUB2 opposite to the liquid crystal material.

Here, in FIG. 6, all views are as seen from the observation side of the liquid crystal display device. That is, the first stage represents the case in which the chiral material is not contained in the liquid crystal material, and, hence, the first stage shows the constitution of the above-mentioned essential part of the embodiment. The direction of the electric field assumes angles of 45°, 135°, 225°, 315° with respect to the x axis depending on the shape of the sub pixels of the pixel electrode PX, and, hence, the directions of the polarization axes of the respective polarizers are set such that the direction of the polarization axis of one polarizer is set within a range of ±30° with respect to the x axis, while the direction of the polarization axis of the other polarizer is set to 90° with respect to the x axis. On the other hand, by setting the respective extending directions of the recessed portions or the projecting portions such that one extending direction falls within a range of +300 with respect to the x axis and the other extending direction assumes an angle of 90° with respect to the x axis, it is possible to obviate the generation of a so-called extinction pattern.

The second stage represents the case in which the chiral material is not contained in the liquid crystal and the shape of the sub pixels of the pixel electrode PX is set to a shape as shown in FIG. 5. In this case, the directions of the electric field assume angles of 0°, 90°, 180°, 270° with respect to the x axis. In this case, with respect to the directions of the polarization axes of the respective polarizers, one direction of the polarization axis is set to a value within a range of 15° to 75° with respect to the x axis, while the other direction of the polarization axis is set to an angle of 90° with respect to the x axis. On the other hand, by setting the respective extending directions of the recessed portions or the projecting portions such that one extending direction falls within a range of 15° to 75° with respect to the x axis and the other extending direction assumes an angle of 90° with respect to the x axis, it is possible to obviate the generation of the above-mentioned so-called extinction pattern.

The third stage represents the case in which the chiral material is contained in the liquid crystal and the directions of the electric field on the sub pixels of the pixel electrode PX assume angles of 45°, 135°, 225°, 315° with respect to the x axis. In this case, with respect to the directions of the polarization axes of the respective polarizers, one direction of the polarization axis is set to a value within a range of 15° to 75° with respect to the x axis, while the other direction of the polarization axis is set to an angle of 90° with respect to the x axis. On the other hand, by setting the respective extending directions of the recessed portions or the projecting portions such that one extending direction falls within a range of 150 to 750 with respect to the x axis and the other extending direction assumes an angle of 90° with respect to the x axis, it is possible to obviate the generation of the above-mentioned so-called extinction pattern.

The fourth stage represents the case in which the chiral material is contained in the liquid crystal and the directions of the electric field on the sub pixels of the pixel electrode PX assume angles of 0°, 90°, 180°, 270° with respect to the x axis. In this case, with respect to the directions of the polarization axes of the respective polarizers, one direction of the polarization axis is set to a value within a range of ±30° with respect to the x axis, while the other direction of the polarization axis is set to an angle of 90° with respect to the x axis. On the other hand, by setting the respective extending directions of the recessed portions or the projecting portions such that one extending direction falls within a range of ±30° with respect to the x axis and the other extending direction assumes an angle of 90° with respect to the x axis, it is possible to obviate the generation of the above-mentioned so-called extinction pattern.

From the above, it is apparent that the extending directions of the recessed portions or projecting portions depend on the directions of the polarization axes of the respective polarizers, irrespective of the presence or absence of the chiral material in the liquid crystal material and the directions of the electric fields on the sub pixels of the pixel electrode PX.

That is, when the liquid crystal molecules are tilted in parallel with respect to the substrates, with the provision of the above-mentioned projecting portions PRJ or the recessed portions DTN, which are formed in a direction substantially equal to the directions of the polarization axes of the respective polarizers, it is possible to obstruct the tilting of the liquid crystal molecules along the polarization axes of the respective polarizers in a concentrated manner. As a result, the generation of the extinction pattern can be prevented.

Embodiment 2

Figure 7:
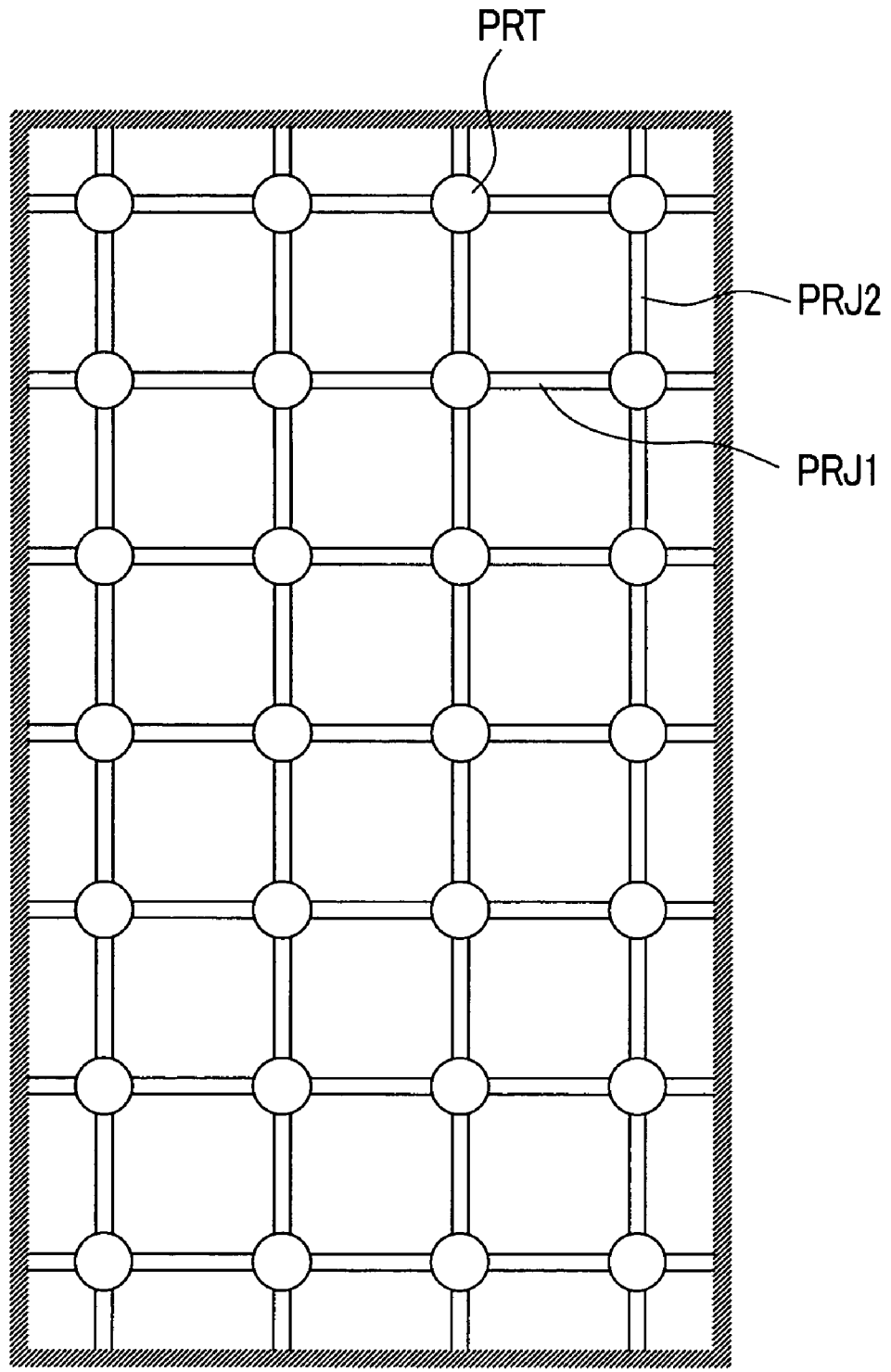
FIG. 7 is a diagrammatic plan view showing another embodiment of the liquid crystal display device according to the present invention.

FIG. 7 is a diagram showing another embodiment of the liquid crystal display device according to the present invention in the form of a plan view as seen of the transparent substrate SUB2 from the liquid crystal side.

In this case, the directions of the polarization axis of the polarizers POL1 or POL2 are set to values within a range of −30° to 30° with respect to the direction of the x axis (running direction of the gate signal lines GL), and, hence, one projecting portion PRJ1 of the projecting portions PRJ which correspond to respective sub pixels of the pixel electrode PX is also set within a range of −30° to 30°. Accordingly, in this embodiment, the projecting portion PRJ1 and the projecting portions PRJ1 of adjacent pixel regions which are arranged close to the former pixel region in the lateral direction are connected to each other linearly. Further, since the other projecting portions PRJ2 assume a direction orthogonal to the direction of the projecting portions PRJ1, in the same manner, the projecting portions PRJ2 and the projecting portions PRJ2 of adjacent pixel regions laterally arranged close to the former pixel region are connected to each other linearly.

Figure 8:
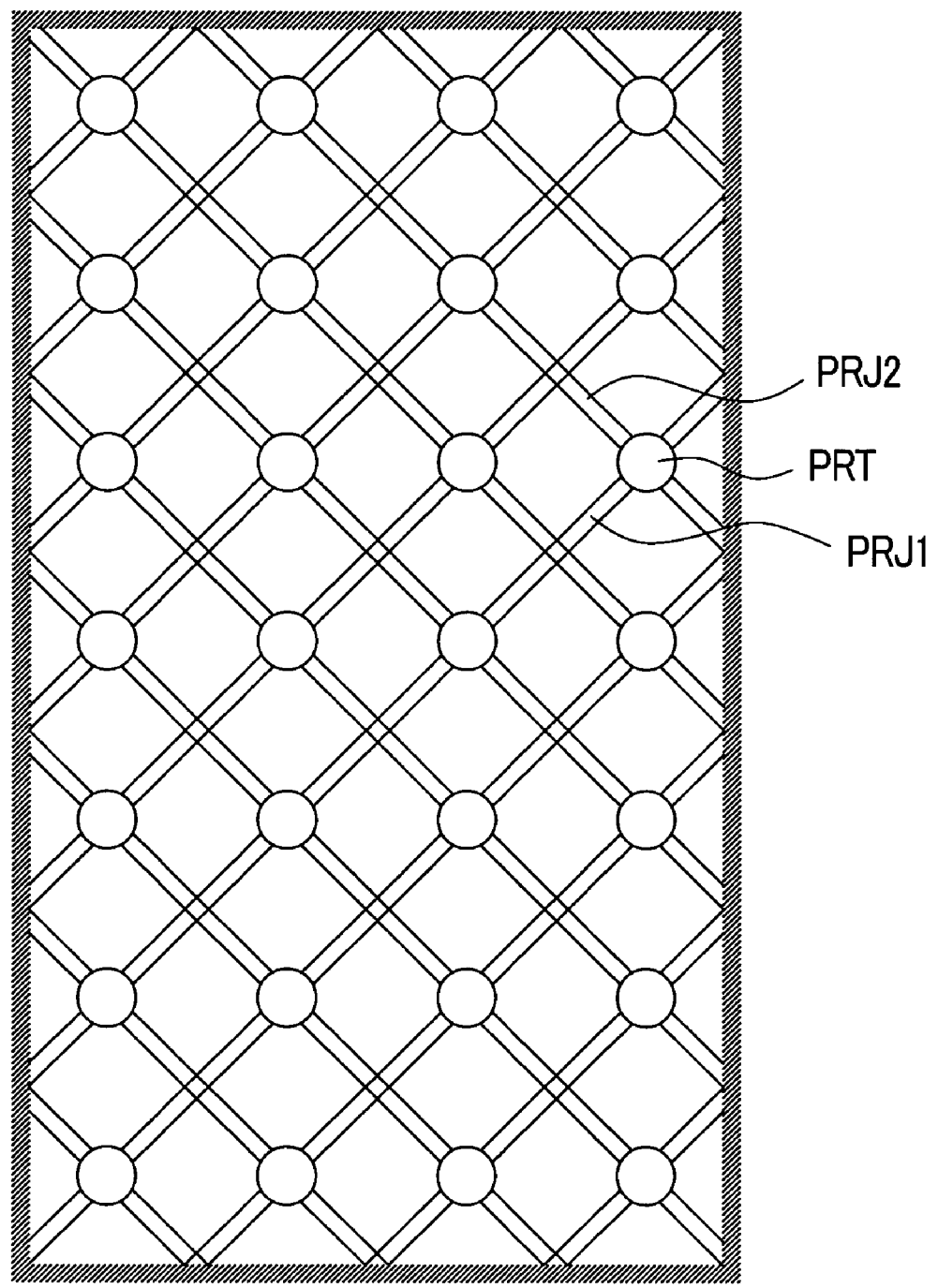
FIG. 8 is a diagrammatic plan view showing another embodiment of the liquid crystal display device according to the present invention.

FIG. 8 is a diagram showing another embodiment of the liquid crystal display device according to the present invention in the form of a plan view as seen of the transparent substrate SUB2 from the liquid crystal side.

In this case, the directions of the polarization axis of the polarizers POL1 or POL2 are set to values within a range of 15° to 75° with respect to the x axis (running direction of the gate signal lines GL), and, hence, one projecting portion PRJ1 of the projecting portions PRJ which correspond to respective sub pixels of the pixel electrode PX are also set within a range of 15° to 75°. Accordingly, in this embodiment, the projecting portions PRJ1 and the projecting portions PRJ1 of adjacent pixel regions which are obliquely arranged close to the former pixel region are connected to each other linearly. Further, since the other projecting portions PRJ2 assume a direction orthogonal to the direction of the projecting portions PRJ1, in the same manner, the projecting portions PRJ2 and the projecting portions PRJ2 of adjacent pixel regions which are obliquely arranged close to the former pixel region are connected to each other linearly.

Embodiment 4

Figure 9:
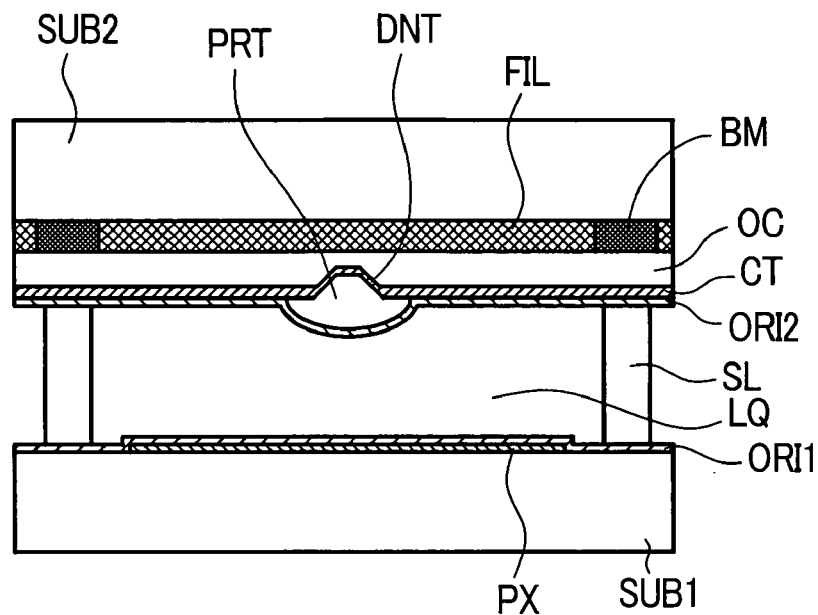
FIG. 9 is a cross-sectional view showing another embodiment of the liquid crystal display device according to the present invention.

FIG. 9 is a diagram showing another embodiment of a liquid crystal display device according to the present invention in the form of a cross section of the protruding portion PRT corresponding to the sub pixel of the pixel electrode PX. This view explicitly shows that, in place of the projecting portions PRJ which extend in a cruciform about the protruding portions PRT, recessed portions DNT are formed in the leveling film OC.

Although only one sub pixel is shown as an example of the pixel electrode PX in the drawing for the sake of brevity, in the actual liquid crystal display device, with respect to the peripheries of the projecting portions PRJ corresponding to other sub pixels, the recessed portions DNT, which extend in a cruciform shape, are formed about the protruding portions PRT.

Embodiment 5

Figure 10:
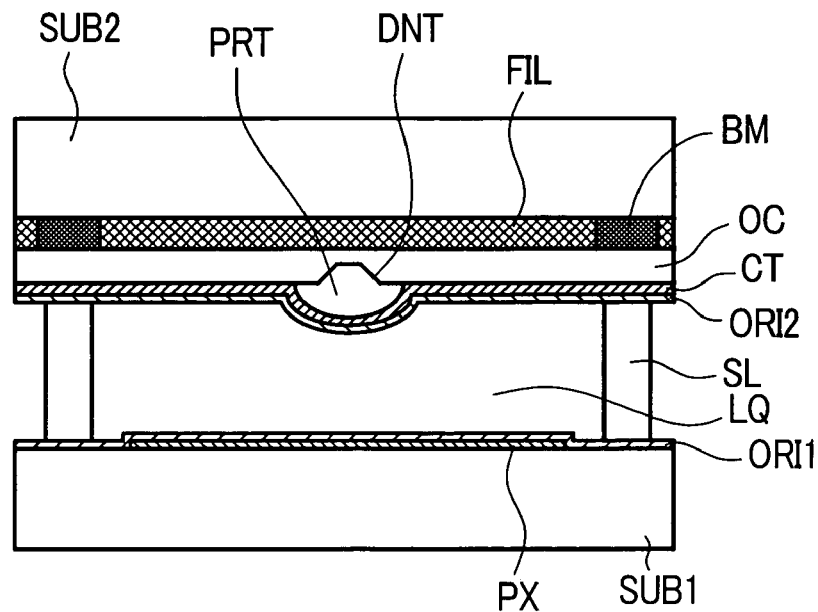
FIG. 10 is a cross-sectional view showing another embodiment of the liquid crystal display device according to the present invention.

FIG. 10 is a diagram showing another embodiment of the liquid crystal display device according to the present invention, and it generally corresponds to FIG. 9.

The feature which makes this embodiment different from the embodiment shown in FIG. 9 lies in the fact that the protruding portions PRT and the counter electrode CT are formed in a reversed manner. That is, the protruding portions PRT are formed on an upper surface of the leveling film OC in which the recessed portions DNT are formed, and the counter electrode CT is formed on a surface of the leveling film OC such that the counter electrode CT also covers the protruding portions PRT.

Embodiment 6

Figure 11:
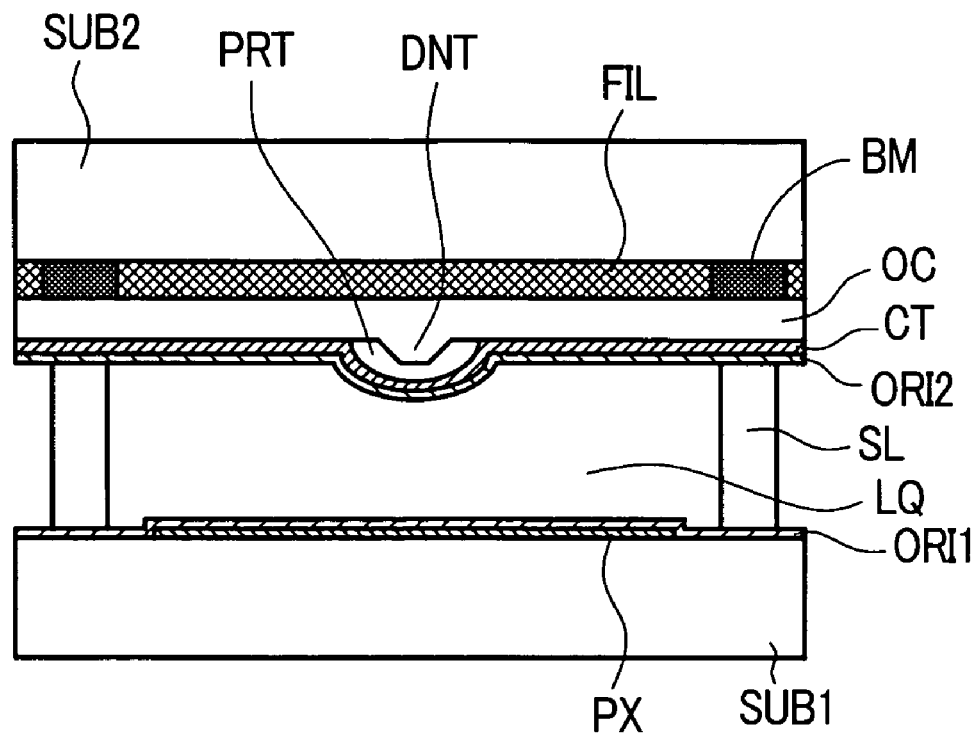
FIG. 11 is a cross-sectional view showing another embodiment of the liquid crystal display device according to the present invention.
Figure 12:
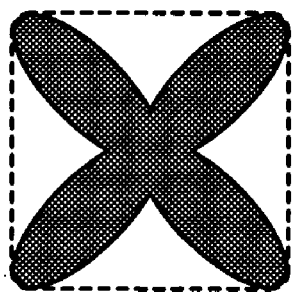
FIG. 12 is a diagram showing an extinction pattern displayed on a conventional liquid crystal display device.

FIG. 11 is a diagram showing another embodiment of the liquid crystal display device according to the present invention, and it generally corresponds to FIG. 10.

The feature which makes this embodiment different from the embodiment shown in FIG. 10 lies in the fact that projecting portions PRJ are formed in place of the recessed portions DNT.

Embodiment 7

In the above-mentioned embodiments, the pixel electrode PX side is constituted of a large number of sub pixels, and the protruding portions PRT are formed on the counter electrode CT side. However, it is needless to say that by forming a large number of sub pixels on the counter electrode CT side and by forming the protruding portions on the pixel electrode PX side, it is possible to obtain substantially the same advantageous effects. This is because, although signals different from each other are supplied to the pixel electrodes PX and the counter electrode CT, there is no such difference with respect to respective electrodes in the behavior of the liquid crystal.

The features of above-mentioned embodiments may be used individually or in combination. This is because it is possible to obtain the advantageous effects of the respective embodiments in a single form or synergistically.

As can be clearly understood from the foregoing explanation, according to the liquid crystal display device of the present invention, it is possible to obviate the generation of an extinction pattern.

What is claimed is:

1. A liquid crystal display device characterized in that molecules of liquid crystal interposed between first and second substrates, which are arranged to face each other in an opposed manner, are arranged in the vertical direction with respect to the substrate at the time of applying no voltage, and the liquid crystal display device further includes a plurality of protruding portions which are scattered on a surface of one substrate in contact with the liquid crystal in respective pixel regions, and projecting portions or recessed portions which are provided about these protruding portions, the projecting portions or the recessed portions being substantially aligned with the directions of respective polarization axes of one polarizer, which is provided to a surface of one substrate at a side opposite to a liquid crystal side, and of another polarizer, which is provided to a surface of the other substrate at a side opposite to a liquid crystal side.

2. A liquid crystal display device according to claim 1, wherein the liquid crystal contains a chiral material.

3. A liquid crystal display device according to claim 1, wherein the liquid crystal contains no chiral material.

4. A liquid crystal display device characterized in that, in each pixel region, on a liquid-crystal-side surface of a first substrate of first and second substrates which are arranged to face each other in an opposed manner with liquid crystal sandwiched therebetween, there are a switching element which is driven by scanning signals from a gate signal line and a pixel electrode to which video signals are supplied from a drain signal line via the switching element, and there is a counter electrode which corresponds in common to said pixel regions on a liquid-crystal-side surface of the second substrate, and one polarizer is provided to a surface of one substrate at a side opposite to a liquid crystal side and another polarizer is provided to a surface of the other substrate at a side opposite to a liquid crystal side, and the pixel electrode is constituted of a mass of a plurality of sub pixels, and further including protruding portions which are positioned at substantially the centers of respective sub pixels on a surface of the second substrate which faces the liquid crystal, and projecting portions or recessed portions which are provided about the protruding portions, the projecting portions or the recessed portions being substantially aligned with the directions of respective polarization axes of one polarizer which is provided to a surface of one substrate at a side opposite to a liquid crystal side and of another polarizer which is provided to a surface of the other substrate at a side opposite to a liquid crystal side;

wherein the projecting portions or the recessed portions are formed on a surface of a leveling film which is formed on a surface of the second substrate which is brought into contact with the liquid crystal.

5. A liquid crystal display device according to claim 4, wherein the counter electrode is formed on a surface of a leveling film and the protruding portions are formed on a surface of the counter electrode.

6. A liquid crystal display device according to claim 4, wherein the protruding portions are formed on a surface of a leveling film and the counter electrode is formed on a surface of the leveling film such that the counter electrode also covers the projecting portions.

* * * * *